July 9, 1946.  G. E. DATH  2,403,583
RAILWAY DRAFT RIGGING
Filed June 28, 1943  2 Sheets-Sheet 1
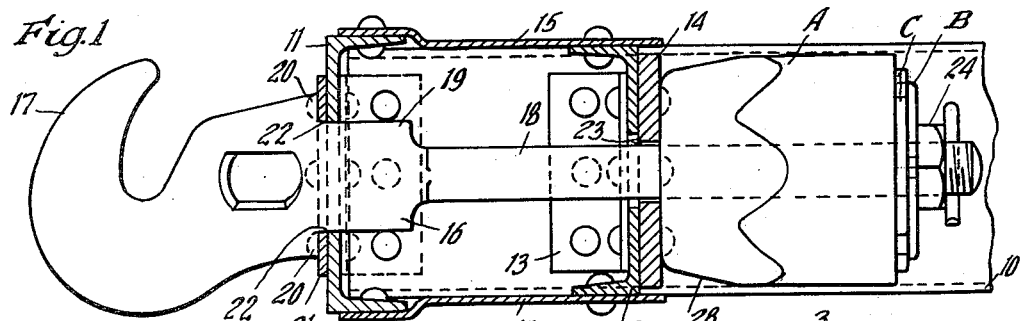
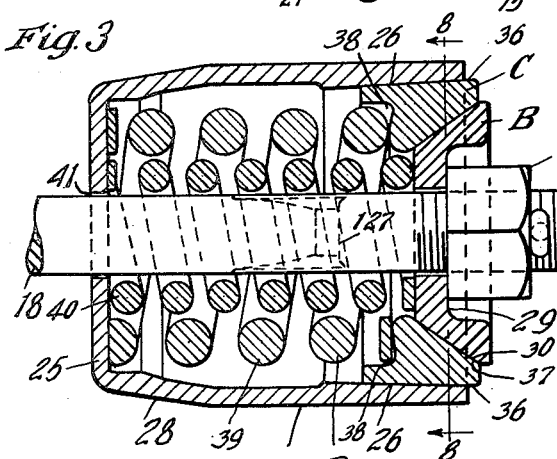
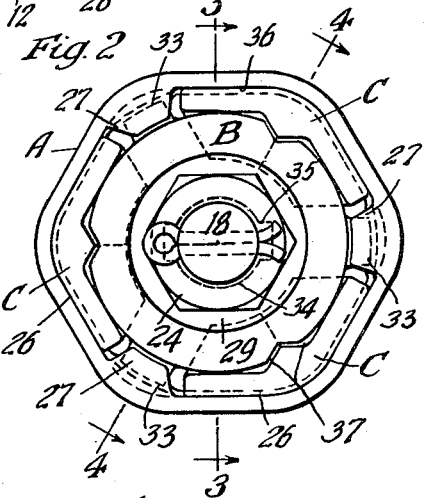
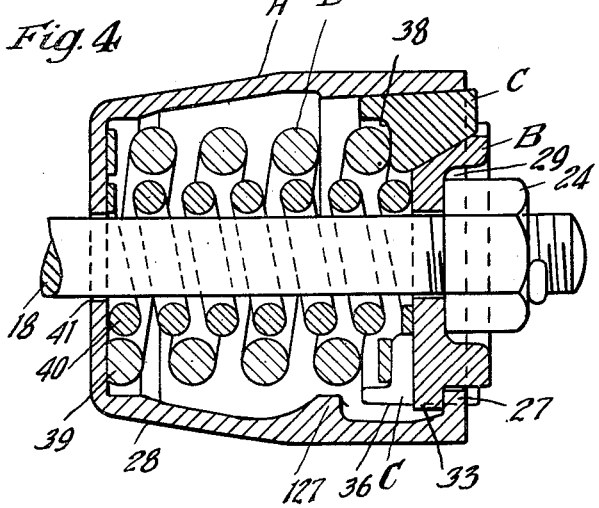
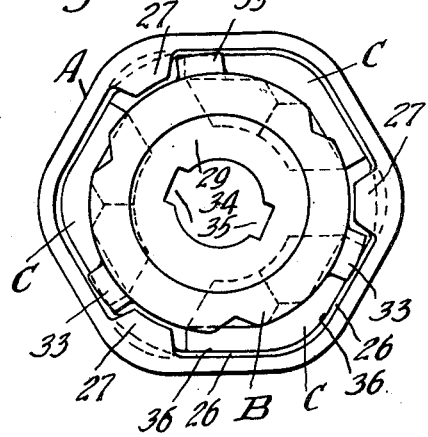
Inventor
George E. Dath
By Henry Fuchs.
Atty.

July 9, 1946.    G. E. DATH    2,403,583
RAILWAY DRAFT RIGGING
Filed June 28, 1943    2 Sheets-Sheet 2
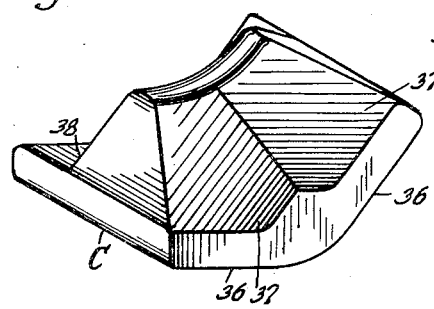
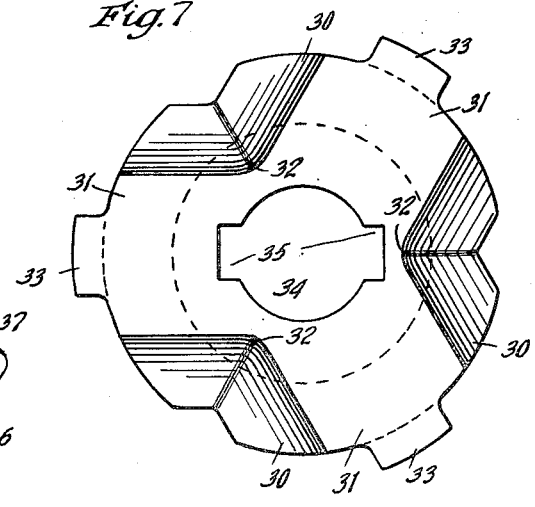
Inventor
George E. Dath
By Henry Fuchs
Atty.

Patented July 9, 1946

2,403,583

UNITED STATES PATENT OFFICE 2,403,583

RAILWAY DRAFT RIGGING

George E. Dath, Chicago, Ill., assignor to W. H. Miner, Inc., Chicago, Ill., a corporation of Delaware Application June 28, 1943, Serial No. 492,478

4 Claims. (Cl. 213—34)

1

This invention relates to improvements in railway draft riggings.

One object of the invention is to provide a railway draft rigging, including friction shock absorbing means, especially adapted for cushioning the draft shocks to which a railway car is subjected in service.

A more specific object of the invention is to provide in a draft rigging of the character indicated in the preceding paragraph simple and efficient friction shock absorbing means for cushioning draft shocks, comprising a friction casing and a spring resisted friction clutch telescoped within the casing and actuated by a drawbar which extends centrally through the casing and has shouldered engagement with the friction clutch to move the same lengthwise with respect to the casing.

A further object of the invention is to provide a friction shock absorbing mechanism especially adapted for railway draft riggings, comprising a friction casing open at one end only, and having interior friction surfaces, a plurality of friction shoes having sliding frictional engagement with the friction surfaces of the casing, spring means within the casing opposing inward movement of the shoes, and a wedge block having wedging engagement with the shoes to spread the same apart, wherein the wedge is provided with retaining lugs adapted to engage shoulders on the casing to limit outward movement of the wedge and wherein the parts are so designed that the wedge, shoes, and spring resistance may be assembled with the casing by entering the same through the open front end of the casing, thereby making it possible to use a one-piece casing structure having the rear end closed by a permanent wall member integral with the casing walls.

Other objects of the invention will more clearly appear from the description and claims hereinafter following.

In the drawings forming a part of this specification, Figure 1 is a longitudinal sectional view through the underframe structure of a car, illustrating my improvements in connection therewith, and showing the drawbar and the friction shock absorbing mechanism in side elevation. Figure 2 is an end elevational view, on an enlarged scale, of the shock absorbing mechanism shown in Figure 1, looking from right to left in said figure. Figures 3 and 4 are longitudinal sectional views, corresponding respectively to the lines 3—3 and 4—4 of Figure 2. Figure 5 is a view similar to Figure 2, but illustrating certain of the parts of the mechanism in different posi-

2 tion. Figure 6 is a detail perspective view of one of the friction shoes of the friction shock absorbing mechanism. Figure 7 is an elevational view, looking at the inner end of the wedge member employed in the shock absorbing mechanism illustrated in Figures 2, 3, and 4.

In said drawings, 10 indicates one of the longitudinal center sills of a railway car, 11 the end sill, and 12 the front stop member. As is well known to those skilled in this art, the underframe structure of a railway car includes two laterally spaced center sills 10 which are secured to the end sill 11 at their front or outer ends. The end sill 11 and the stop member 12 are in the form of channel members presenting horizontal flanges at their top and bottom edges. The stop member 12 extends transversely between the center sills and is secured to the latter at opposite ends by angle plates 13, one of which is shown in Figure 1. The stop member 12 is reinforced on its inner side by a relatively heavy plate 14, which is preferably welded thereto. The channel members are connected by top and bottom plates 15—15, which are riveted to the flanges thereof. The drawbar of the draft rigging, which is of the hook type, is indicated by 16. The drawbar comprises a hooked head portion 17 and a cylindrical shank portion 18. The hook is formed at the front of the head and rearwardly of the hook the head is reduced in height, as indicated at 19, thereby providing top and bottom stop shoulders 20—20. A striking plate 21 secured to the outer side of the end sill 11 serves as an abutment for the shoulders 20—20 to limit inward movement of the drawbar. The striking plate 21 and the end sill 11 are provided with aligned guide openings 22 for the reduced rear end portion 19 of the drawbar head, and the stop member 12 and its reinforcing plate 14 are provided with concentric openings 23 through which the shank 18 of the drawbar extends.

The friction shock absorbing mechanism of my improved railway draft rigging is disposed rearwardly of the stop 12 and has the shank of the coupler extending therethrough. At the rear end the coupler shank carries a nut 24, which is threaded thereon, and forms an abutment or stop shoulder cooperating with the shock absorbing mechanism.

My improved shock absorbing mechanism comprises broadly a combined friction shell and spring cage A, a wedge B, three friction shoes C—C—C, and a spring resistance D.

The combined shell and cage A is in the form of a casing of substantially hexagonal cross section, having the friction shell section formed at one end thereof and the spring cage section at the other end. The casing A is closed at the spring cage end thereof by a transverse wall 25 formed integral with the side walls. The friction shell section of the casing is provided with six interior, substantially flat, inwardly converging, friction surfaces 26, which are spaced symmetrically about the central longitudinal axis of the mechanism. The friction surfaces 26 are arranged in pairs, the adjacent surfaces of each pair together forming a friction face of V-shaped transverse contour. At the open friction shell end, the casing A is provided with three inwardly projecting stop lugs 27—27—27 which are at alternate corners of the casing, that is, they are alternated with the three pairs of friction surfaces 26—26, 26—26, and 26—26, the same being located between adjacent of said V-shaped friction faces which are formed by the pairs of surfaces 26—26. Spaced inwardly from the stop lugs 27 and respectively in longitudinal alignment therewith are stop lugs 127—127—127, which serve to limit inward movement of the wedge B. At the closed spring cage end portion thereof, the casing A is reduced in size, as indicated at 28, the exterior corners being flattened.

The wedge B is in the form of a block having an outwardly opening central pocket at the outer end thereof forming a seat 29 adapted to accommodate the nut 24 of the coupler shank. The block B is provided with three reentrant wedge faces 30—30—30 of V-shaped transverse cross section. The wedge faces 30 are arranged symmetrically about the longitudinal central axis of the mechanism in spaced relation, thereby providing solid sections or arms 31—31—31 between said V-shaped faces. The two angularly disposed sections or walls of each V-shaped face, which are indicated respectively by 32—32, diverge toward the inner end of the wedge and laterally outwardly of the same. In other words, the V-shaped faces 30—30 have the diverging sections or walls thereof arranged so that the meeting edges of the sections 32—32 thereof at the angle of the V lie in a line inclined inwardly towards the central longitudinal axis of the mechanism. The inner end faces of the solid sections 31 of said block are substantially flat, as shown in Figure 7. At the inner end portion thereof, the block B has three laterally outwardly projecting radial lugs 33—33—33, which are alternated with the wedge faces 30—30—30, as clearly shown in Figure 7. In other words, the lugs 33 project from the solid sections 31—31—31 of the block and are so located that they extend between adjacent shoes C to engage in back of the lugs 27 of the casing and restrict movement of the wedge outwardly of the casing or in a rearward direction, as seen in Figure 1. Inward movement of the wedge is limited by engagement with the lugs 127—127—127.

The coupler shank 18 extends through the wedge B, the latter being provided with an axial opening 34 therethrough to receive the shank. Diametrically opposite wall portions of the opening are cut out, as indicated at 35, to receive a barlike tool for manipulating the wedge in assembling the mechanism, as hereinafter pointed out.

The three friction shoes C—C—C are of similar design, each shoe having on the lateral outer side thereof a longitudinally extending V-shaped friction face 36 formed by two adjacent angularly arranged friction surfaces which are adapted to cooperate with two adjacent surfaces 26—26, a pair forming one of the V-shaped friction faces of the casing. On the lateral inner side, each shoe is provided with an enlargement having a projecting V-shaped wedge face 37, fitting one of the V-shaped reentrant wedge faces 30 of the block B and having the angular sections thereof correspondingly inclined to the angular sections 32—32 of said face 30. The inner ends of the shoes C—C—C are recessed, as indicated at 38, thereby providing a seat on each shoe for the front end of the outer member of the spring resistance D.

The spring resistance D comprises a relatively heavy outer coil 39 and a lighter inner coil 40. The outer coil 39 of the spring has its opposite ends bearing respectively on the shoes C and the end wall 25 of the casing, the end thereof which bears on the shoes being engaged within the seats 38 of said shoes. The inner coil spring 40 has its opposite ends bearing respectively on the inner end of the wedge B and the end wall 25 of the casing.

As hereinbefore stated, the shank 18 of the drawbar extends through the shock absorbing mechanism, and as clearly shown in Figures 3 and 4, the transverse end wall 25 of the casing is provided with a central opening 41 adapted to freely accommodate the shank for longitudinal movement with respect to the casing A. The shank 18 extends through said opening 41 of the end wall 25, and the inner coil 40 of the spring resistance, and through the central opening 34 of the wedge block B and has the nut 24 thereof seated in the pocket 29 of said block.

In assembling the friction shock absorbing mechanism, the springs 39 and 40 are first inserted within the casing A. The shoes C—C—C are then placed within the casing in abutting relation to the coil spring 39 and forced inwardly beyond the position shown in Figure 4 and held in said position by a suitable tool or clamp. The wedge B is then placed on the spring 40, being positioned as shown in Figure 5. As will be evident upon reference to said last named figure, the position of the wedge B is such that the lugs 33 thereof will clear the lugs 27 of the casing A, that is, the wedge B is shown as having been rotated slightly about its axis in a right hand direction from the position shown in Figure 2. With the wedge in the position shown in Figure 5, and the shoes held in said inward position, the wedge is pushed inwardly of the casing A against the spring 40 by a suitable tool until the lugs 33 are disposed inwardly and clear of the lugs 27 of the casing. The wedge is then given a partial turn to the left from the position shown in Figure 5 to the position shown in Figure 2, thereby bringing the lugs 33 behind the lugs 27 in aligned position with the latter. In this position of the wedge B, the V-shaped wedge faces 30 thereof are in alignment with the V-shaped faces 37 of the shoes so that there is flat surface contact between the sections 32—32 of the faces 30 with the corresponding sections of the V-shaped faces 37 of the shoes when the latter are projected outwardly by the spring 39.

In order to facilitate assembling of the mechanism, a tool in the form of a spanner is preferably employed to rotate the wedge block B, the wedge for this purpose being provided with the opening 34, which is notched as indicated at 35—35, to receive the spanner.

After the assembling operation is completed and pressure on the shoes C and the wedge B is relieved, the springs 39 and 40 force the wedge and shoes outwardly, thereby bringing the lugs 33 of the wedge against the lugs 27 of the casing and seating the projecting wedge faces of the shoes in the reentrant V-shaped faces of the wedge B, thereby locking the wedge against rotation.

The assembled shock absorbing mechanism is then applied to the car by placing the same between the draft sills thereof immediately in back of the front stop 12 with the drawbar shank 18 engaged through the casing A, spring 40, and wedge B of the friction shock absorbing mechanism, with the nut 24 of the shank seated in the pocket 29 of the wedge B.

The operation of my improved railway draft rigging is as follows: Upon a pulling action being applied to the drawbar 16, the wedge B is moved forwardly therewith and inwardly of the casing A, which is held stationary by engagement with the front stop 12. Upon inward movement of the wedge B with respect to the casing A, the spring resisted friction shoes are wedged apart and carried inwardly of the mechanism compressing the spring resistance D, thus producing high frictional resistance between the friction surfaces of the shoes and the casing, the spring 39 of the spring resistance being directly compressed by the shoes and the spring 40 by the wedge. Compression of the mechanism is positively limited by engagement of the wedge B with the stop lugs 127, thereby preventing undue compression of the springs. Upon the pulling force on the drawbar 16 being reduced, the actuating force on the wedge is also reduced and the expansive action of the spring resistance D returns all of the parts to the normal position shown in Figures 1, 2, and 3, the drawbar being carried backwardly or inwardly of the car by the wedge B until outward movement of the wedge B with respect to the casing A is limited by engagement of the lugs 33 of the wedge with the lugs 27 of the casing.

I claim:

1. In a draft rigging for a railway car provided with an underframe structure, including an end sill and a front stop member, the combination with a casing open at one end and closed at the other end, said closed end abutting said front stop of the underframe structure; of a drawbar extending through said end sill, front stop, and casing, said drawbar being movable lengthwise of the casing; friction shoes within the casing surrounding said drawbar, said shoes having frictional engagement with the interior walls of the casing; a wedge block on said drawbar, said drawbar having shouldered engagement with the wedge block to move the latter inwardly of the casing in draft, said wedge block having wedging engagement with the shoes to force the same against the friction surfaces of the casing and along said walls; and spring means within the casing opposing inward movement of the shoes.

2. In a draft rigging for a railway car provided with an underframe structure, including an end sill and a front stop member, the combination with a casing open at one end and closed at the other end, said closed end abutting said front stop of the underframe; of a drawbar extending through said end sill, front stop, and casing, said drawbar being movable lengthwise of the casing; friction shoes within the casing surrounding said drawbar, said shoes having lengthwise sliding movement on the interior walls of the casing; a spring within the casing surrounding said drawbar and yieldingly opposing inward movement of said shoes; and a wedge block through which said drawbar extends, said drawbar having shouldered engagement with the wedge block to move the latter inwardly of the casing in draft, said wedge block and shoes having cooperating wedge faces, said wedge block and casing having cooperating retaining lugs for limiting outward movement of the wedge with respect to the casing.

3. In a friction shock absorbing mechanism, the combination with a friction casing closed at one end and open at the other end, said casing having interior friction surfaces at said open end; of a plurality of friction shoes within said casing, said shoes being circumferentially spaced and having sliding frictional engagement with the interior friction surfaces of the casing; a central wedge engaging said shoes, said wedge having radially projecting arms defining pockets therebetween, said pockets opening outwardly and each of said pockets having a pair of laterally outwardly diverging walls formed on adjacent arms defining a reentrant wedge face of V-shaped, transverse cross section, said shoes having wedge faces of V-shaped cross section, said shoe wedge faces projecting between the outwardly diverging walls of the V-shaped faces of the wedge, said V-shaped reentrant wedge faces of the wedge being circumferentially spaced and said wedge having radially, outwardly projecting, retaining lugs thereon, said lugs projecting from said arms of the wedge at points between the wedge faces of said wedge, said lugs extending between adjacent shoes and into shouldered engagement with the lugs of the casing to limit outward movement of said wedge; and spring means within the casing yieldingly opposing inward movement of the shoes.

4. In a friction shock absorbing mechanism, the combination with a friction casing open at one end, said casing having interior friction surfaces at said open end thereof, said surfaces extending lengthwise of the casing; of three inwardly projecting retaining lugs on the open end of the casing; a central wedge block having three circumferentially spaced, reentrant, V-shaped, cut-in wedge faces, the sections of said wedge between said reentrant, V-shaped, cut-in wedge faces presenting radial arms; a radial retaining lug projecting from each arm and having shouldered engagement with the corresponding retaining lug of the casing to restrict outward movement of the wedge; three friction shoes having sliding frictional engagement with the friction surfaces of the casing, each of said shoes having a projecting V-shaped wedge face on the inner side thereof engaging with one of the reentrant, V-shaped faces of the wedge; and spring means opposing inward movement of said wedge and shoes.

GEORGE E. DATH.